HUGH HANNA.

Improvement in Thrashing Machine Reel.

No. 125,566.  Patented April 9, 1872.

WITNESSES:
Parker H. Sweet, Jr.
Wm J. Peyton.

INVENTOR:
Hugh Hanna
By J. J. Johnston & Bro
his attorneys 125,566

UNITED STATES PATENT OFFICE.

HUGH HANNA, OF PITTSBURG, PENNSYLVANIA.

IMPROVEMENT IN THRASHING-MACHINE REELS.

Specification forming part of Letters Patent No. 125,566, dated April 9, 1872.

*To all whom it may concern:*

Be it known that I, HUGH HANNA, a subject of Great Britain, now residing in Pittsburg, in the county of Allegheny and State of Pennsylvania, have invented a certain new and useful Improvement in Thrashing-Reels for Thrashing-Machines; and I do hereby declare that the following is a full, clear, and exact description thereof, reference being had to the accompanying drawing and to the letters of reference marked thereon.

The nature of my invention consists chiefly in constructing the beater-bars of angle-iron, and attaching them to the disks or arms radiating from the axis of the reel, whereby simplicity and economy of construction are obtained. My invention also consists in providing said beater-bars with a detached face piece for changing the angle of the working-faces of the beater-bars with relation to a line radiating from the axis of the thrashing-reel. My invention further consists in providing the working-faces of the beater-bars with a covering of leather, or other soft substance or material, the whole being constructed for and adapted to the purposes hereinafter described.

To enable others skilled in the art to make and use my invention, I will proceed to describe more fully its construction and operation.

Figure 1:
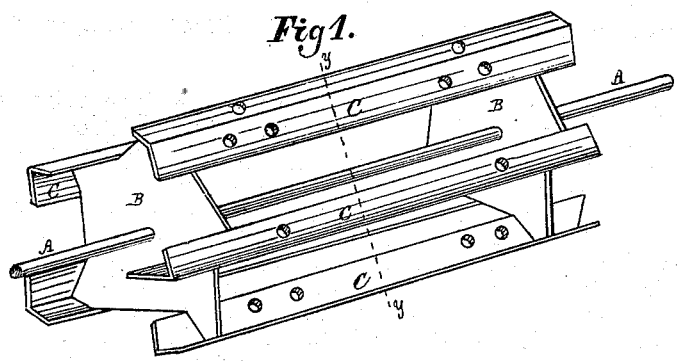
Figure 2:
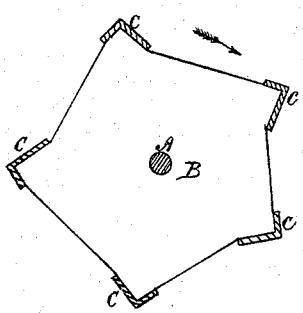
Figure 3:
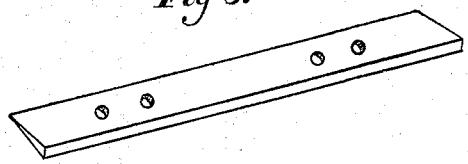

In the accompanying drawing, which forms part of my specification, Figure 1 is a perspective view of my improvement in thrashing-reels. Fig. 2 is a transverse section of the same at line *y* of Fig. 1. Fig. 3 is a perspective view of the detached face piece of the beater-bars.

A represents the axis; B, the disks to which the bars C are attached. The beater-bars may be secured to radial arms as well as disks, and constructed of angle-iron, as shown in the accompanying drawing, whereby strength, firmness, and durability are obtained. The detached face piece, represented in Fig. 3, is used for the purpose of adapting the beater-bars to thrashing the different kinds of grain or seed. When I desire to thrash grain or seed for planting, I face the working-faces of the beater-bars with leather or other soft material, whereby I save the grain from being broken, cracked, or otherwise injured. It is well known that the breaking, cracking, and other injury which grain receives by being thrashed from its straw by thrashing-machines is to a very great extent the cause of the diminished crops, which are now becoming a very general thing in all parts of the country, and is a source of loss to the farmer and consumer.

The thrashing-reel, hereinbefore described, can be used in all known forms of thrashing-machines in which a thrashing reel or cylinder is used, and it can be used in combination with any known form of a concave without regard to the form of their working-face. The travel of the thrashing-reel, hereinbefore described, is indicated by the arrow in Fig. 2.

Having thus described the nature, construction, and operation of my improvement, what I claim as my invention, is—

1. The reel, hereinbefore described, the beater-bars of which are constructed of angle-iron, and secured to disks or arms radiating from the axis of the reel, in the manner and for the purpose described.

2. In a thrashing-machine, the employment of a detachable, wedged-shaped facing piece, in combination with the beater-bars of the thrashing-reel for changing the angle of their working-faces, as herein described, and for the purpose set forth.

3. The employment, in combination with the beater-bars of a thrashing-machine reel, of removable face pieces constructed of leather or other flexible material for the purpose of thrashing out seed-grain, substantially as herein described.

HUGH HANNA.

Witnesses:
   A. C. JOHNSTON,
   JAMES J. JOHNSTON.